C. M. LOWES & F. D. AMMEN.
SEALING DEVICE FOR COLLECTING WAGONS.
APPLICATION FILED APR. 3, 1914.
1,195,245.
Patented Aug. 22, 1916.
2 SHEETS—SHEET 1.
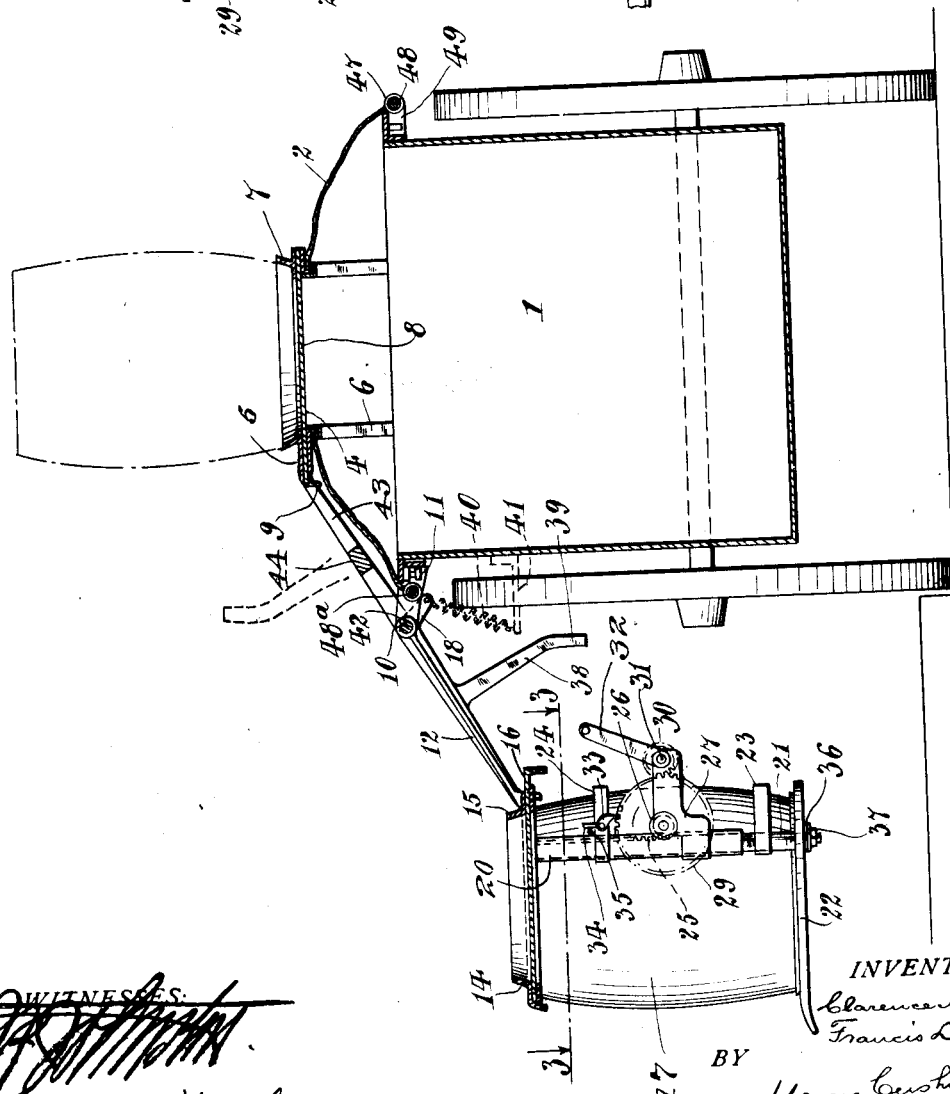
INVENTORS
Clarence M. Lowes
Francis D. Ammen
BY
Meyers, Cushman & Rea
ATTORNEYS,

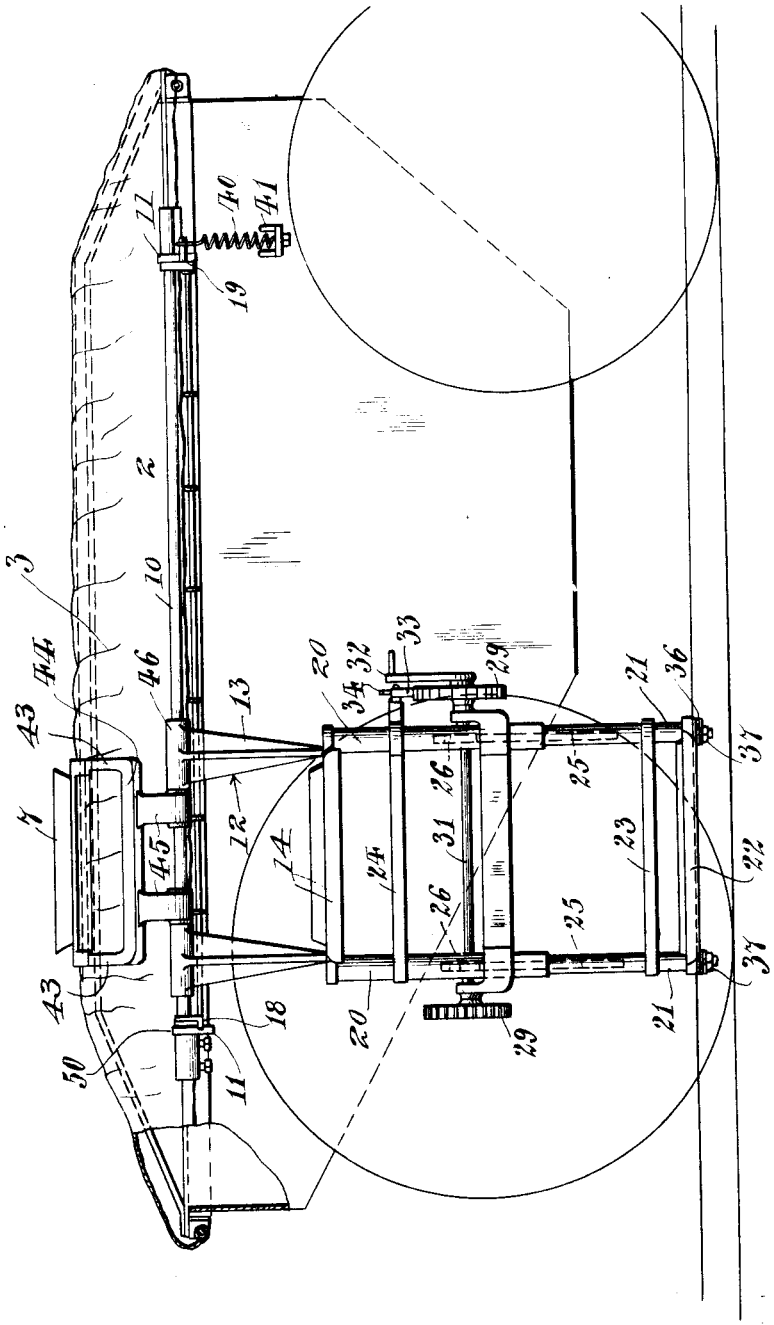

UNITED STATES PATENT OFFICE.

CLARENCE M. LOWES AND FRANCIS D. AMMEN, OF FLUSHING, NEW YORK; SAID AMMEN ASSIGNOR TO SAID LOWES.

SEALING DEVICE FOR COLLECTING-WAGONS.

1,195,245.

Specification of Letters Patent. Patented Aug. 22, 1916.

Application filed April 3, 1914. Serial No. 829,296.

*To all whom it may concern:*

Be it known that we, CLARENCE M. LOWES and FRANCIS D. AMMEN, citizens of the United States, residing at Flushing, Long Island, in the county of Queens and State of New York, have invented new and useful Improvements in Sealing Devices for Collecting-Wagons, of which the following is a specification.

This invention relates to means for facilitating the collecting of debris or any material which is preferably to be kept in a sealed condition while it is being dumped into the wagon.

The invention is expected to be particularly useful for facilitating the dumping of ashes or garbage into the collecting wagons.

A principal object of the invention is to provide an arrangement to facilitate the dumping of the receptacle without exposing its contents to the air, and in this way preventing the scattering of ashes or the dissemination of odors of garbage.

A further object of the invention is to provide an apparatus for this purpose which can be readily operated by one man, the general purpose in this respect being to effect economy in the operation of the collecting wagon.

A further object of the invention is to provide an arrangement which will enable the position in which the receptacle is dumped in the wagon to be changed, the general object in this respect being to fill the wagon at all points. This is particularly desirable where the wagon has a greatly elongated body.

Further objects of the invention will appear hereinafter.

In the drawing, which illustrates the preferred embodiment of our invention, Figure 1 is a vertical cross section illustrating our apparatus as applied to an ordinary ash wagon, and indicating a receptacle such as a barrel in place, and ready to be swung into dumping position over the wagon. Fig. 2 is a side elevation, the wagon body being shown diagrammatically, and in this view the guiding means for receiving the receptacle and guiding the same into position, is shown ready to receive the receptacle. Fig. 3 is a horizontal section taken through the device about on the line 3—3 of Fig. 1. Fig. 4 is a plan showing the frame of the opening through which the receptacle is dumped.

Referring more particularly to the parts 1 represents a wagon body of any ordinary construction. In applying our invention to such a wagon we prefer to provide a hood or cover 2, which is preferably of a flexible material such as duck or canvas, and this cover is loose and preferably arranged with a sufficient number of transverse folds 3 to permit of considerable freedom of movement of the cover longitudinally of the wagon. This longitudinal freedom of movement is for the purpose of enabling the central opening 4 of the cover to be shifted along the wagon body. This arrangement is unnecessary where the wagon is small, and has not an elongated body. The opening 4 is preferably formed by means of a frame 5, which is adapted to slide longitudinally of the wagon body on suitable guide bars 6, such as the angle bars illustrated. The frame 5 is preferably formed on its upper side with an upwardly diverging receiving mouth 7, and below this point it is provided with a movable or removable closure 8 preferably in the form of a slide plate, which may have a lip 9, which may be reached from the side of the wagon so as to pull out the slide.

We prefer to provide also a guiding means for receiving and guiding the receptacle into position to be dumped through the opening 4. For this purpose we prefer to provide a guide bar or guide 10, which is mounted in a fixed position on the upper edge and side of the wagon by means of suitable brackets 11. Between these brackets we provide the swinging arm 12 which preferably consists of two sections or side arms 13, the ends of which are connected with a receptacle cover 14. This receptacle cover 14 preferably has a diverging delivery mouth 15 below which there is provided a removable closure such as the slide plate 16, arranged similarly to the slide plate 8. This arm 12 may be supported at the side of the wagon in order to receive the receptacle 17, for which purpose we prefer to provide the bar 10 with rigid stop arms 18 and 19, the said arms having projections which extend under the lower edges of the brackets 11 and engage therewith to support the arm in approximately the position illustrated. We prefer to provide means for supporting and elevating the receptacle 17 so as to secure it in this guiding apparatus. This arrangement enables the apparatus to receive receptacletacles of any height or size within certain limits, and generally irrespective of the particular shape of the receptacle, that is a cylindrical can can be received or a barrel, such as that illustrated. We prefer to accomplish this purpose by means of tubular guides 20 which extend down from the under side of the receptacle cover, and these guides receive extension bars 21, which extend downwardly and to the lower ends of which are attached a base 22, upon which the receptacle may be received. These bars are preferably connected near their lower ends by a curved band or half hoop 23, which coöperates with a similar band 24 connecting the tubular guides 20, so as to form a rudimentary cradle for the inner side of the receptacle. The extension bars 21 have racks indicated at 25 with ordinary rack teeth, which mesh with pinions 26, said pinions being carried on a frame 27 which is rigidly attached to the tubular guides 20. This arrangement is clearly illustrated in Fig. 3. The pinions engage with the racks through slots 28 in the rear sides of the tubular guides 20. In order to rotate these pinions at a relatively slow speed so as to give a good leverage in raising the receptacle, we provide the pinions with rigid gear wheels 29, which are driven by pinions 30, said pinions being carried on a cross shaft 31, which may be rotated by means of a suitable crank 32. With this arrangement it will be evident that a receptacle such as the barrel 17 may be rolled into position on the base 22, when the base is let down, as indicated in Fig. 2. Then by rotating the crank, the base and receptacle cover may be moved relative to each other. In the present the base can be elevated so as to raise the receptacle and clamp it against the underside of the cover 14. In order to hold the receptacle elevated we prefer to provide a pawl 33, which may be mounted on one of the tubular guides 20, and which engages the teeth of one of the gear wheels 29. This pawl 33 has a tail 34 which can be taken in one's hand so as to release the pawl when desired, and we prefer to provide a small spring 35 back of this tail which tends to hold the pawl in engagement. In order to give slight flexibility in clamping the receptacle in position, we prefer to provide spring washers 36 on the underside of the base 22, which are secured in place by nuts 37. This produces a certain amount of give or lost motion which is desirable, because the pawl 33 may not strike the teeth at the proper point without some such arrangement to insure that the receptacle will be tight between the base and the cover.

It should be understood that if the receptacle has been raised and clamped, as illustrated, it is swung over into the position which is indicated in dotted lines in Fig. 1. In order to facilitate swinging the receptacle over the side arms 13 are preferably provided with levers 38 preferably having slightly bent handles 39, which are nearly vertical; when the swinging movement of the receptacle is started the operator simply grabs the underside of the base in order to initiate the swinging movement. As the receptacle swings up the lever 38 comes into convenient position to be caught and held, and the operator opposes his weight to the weight of the receptacle as it swings over the axis of the guide bar or shaft 10. In order to produce a counterbalancing effect as the receptacle swings over the wagon, we prefer to provide the stop arm 19 with a spring 40, the lower end of which is attached to a bracket 41 on the side of the wagon. As the swinging movement is substantially through 180 degrees, it is evident that after the receptacle has passed over the axis of the bar 10 the arm 19 will place the spring 40 in tension, and this offers a resistance or counterbalancing effect to the receptacle. As the receptacle comes into position the delivery mouth 15 fits in the receiving mouth 7, and the two slides 8 and 16 are then withdrawn in succession so as to permit the contents of the receptacle to dump into the wagon. The closures are then replaced, and the receptacle is swung back, and then released and removed from the guiding and holding device. The arm 12 has a spline connection 42 with the bar or shaft 10, which permits it to slide along the shaft to any position. At the same time when the arm swings up it rotates the shaft so as to rotate the stop arms 18 and 19 which are rigidly attached to the bar.

We prefer to provide an arrangement for maintaining proper alinement between the frame 5 and the guiding device when it is shifted along the wagon. For this purpose we prefer to provide the frame 5 with extension bars 43, which form part of a frame 44 with a pair of arms 45 at its lower portion, which are loosely mounted on the shaft or bar 10. The outer edges of these arms 45 abut against the inner ends of the hubs 46 of the side arms 13, so that when the arms slide along the shaft or bar 10, the frame 44 also slides along. On account of the fact that the arms 45 are loose on the shaft or bar 10 evidently the frame 44 will permit the frame 5 to adapt itself to any slight inaccuracies in the height of the guide bars 6, as the frame 5 slides along them.

Referring again to the flexible cover 2 we prefer to attach this cover removably by means of split rings 47, which may be received around and run along on ring bars 48, which are mounted around the upper edge of the wagon body on suitable brackets 49. Opposite the brackets 11 the cover may be provided with gaps or slots 50 in its edge which receive the brackets 11. On the side of the wagon near the guiding apparatus we provide a special ring bar 48ª, the ends of which are supported on brackets 11.

It will be evident that this device can be as readily applied to wagons of wood as of iron. It does not interfere in any way with the dumping of the wagon, or with the driver.

In adapting the invention to any special type of wagon evidently the bars 6 may be as high above the wagon as desired.

It is understood that the embodiment of the invention illustrated above is only one of the many forms or embodiments our invention may take, and we do not wish to be limited to the practice of the invention, nor in our claims, to the particular embodiment set forth.

What we claim is:—

1. In a sealing apparatus for a wagon for collecting from receptacles, the combination of a cover for the wagon having a receiving opening therein, a movable closure for said opening, a receptacle cover, an arm carrying said receptacle cover and pivotally supported at the side of the wagon so as to swing up in a substantially vertical plane and hold said receptacle cover in an inverted position over the wagon, said receptacle cover constructed to rest upon and engage the upper end of the receptacle, means for engaging the bottom of the receptacle to clamp the receptacle against the receptacle cover and connected with said receptacle cover so as to swing up with the receptacle cover and said arm to hold the receptacle inverted over the wagon, said receptacle cover having a closure movable to permit the evacuation of the said receptacle into the wagon.

2. In a sealing apparatus for a wagon for collecting from receptacles, the combination of a cover for the wagon having a receiving opening therein, a movable closure for said opening, a receptacle cover, an arm carrying said receptacle cover and pivotally supported at the side of the wagon so as to swing in a substantially vertical plane and hold said receptacle cover in an inverted position over the wagon, said receptacle cover constructed to rest upon and engage the upper end of the receptacle, means for engaging the bottom of the receptacle and for elevating the receptacle to clamp the receptacle against the receptacle cover and connected with said receptacle so as to swing up with the receptacle cover and said arm to hold the receptacle inverted over the wagon, said receptacle cover having a closure movable to permit the evacuation of the said receptacle into the wagon.

3. In a sealing apparatus for a wagon for collecting from receptacles, the combination of a cover for the wagon having a receiving opening therein, a movable closure for said opening, a receptacle cover, a lifting arm carrying said receptacle cover and pivotally supported at the side of the wagon so as to swing up in a substantially vertical plane and hold said receptacle cover in an inverted position over the wagon, said receptacle cover constructed to rest upon and engage the upper end of the receptacle, means for engaging the bottom of the receptacle to clamp the receptacle against the receptacle cover and connected with said receptacle cover so as to swing up with the receptacle cover and said arm to hold the receptacle inverted over the wagon, said receptacle cover having a closure movable to permit the evacuation of the said receptacle into the wagon, and a downwardly projecting arm on the lifting arm forming a lever for swinging up the lifting arm.

4. In a sealing apparatus for a collecting wagon in combination, a loose flexible cover having an opening therein and having its edges fixed at the sides of the wagon, a frame about said opening, means for supporting said frame and permitting the shifting of said frame and the adjacent portion of said cover, and means for guiding a receptacle to dump the same through said opening.

5. In a sealing apparatus for a collecting wagon for collecting from receptacles, the combination of a cover of flexible material, having an opening therein, a frame mounted in said cover at said opening, means for supporting and guiding said frame to move longitudinally of the wagon, a movable closure for said opening mounted in said frame, means including a base for engaging the lower end of the receptacle and mounted to swing up over the wagon to guide a receptacle from a point at the ground near the wagon into a dumping position over said frame, and a closure for the receptacle adapted to be removed after the receptacle is alined with the opening.

6. In a sealing apparatus for a collecting wagon in combination, a wagon body, a cover therefor having an opening therein through which a receptacle may be dumped, means for normally closing said opening, a receptacle guiding device pivotally mounted at the side of said wagon having means for securing the receptacle and adapted to guide the receptacle into dumping position over said opening, said receptacle guiding means including a cover adapted to seat over the receptacle and a base to support the receptacle capable of assuming a position near the ground, and means for moving said base toward the receptacle cover to clamp the receptacle therewith.

7. In a sealing apparatus for a collecting wagon in combination, a cover having an opening therein, a closure for said opening, a guiding device to receive the receptacle and guide the same into dumping position over said opening, said guiding device including a cover for the receptacle, a base for the receptacle capable of assuming a position near the ground, means for guiding said base toward and from said receptacle cover, and means for locking said base so as to clamp the receptacle between the same and said cover.

8. In a collecting wagon for collecting from receptacles, the combination of an arm pivotally supported on the wagon and carrying a receptacle cover, a base connected with said receptacle cover to engage the bottom of the receptacle, means including a crank for raising said base to clamp the receptacle between the base and the receptacle cover, said arm operating to swing up and hold said receptacle cover and base over the wagon with the receptacle clamped therebetween in a substantially inverted position, and a movable closure in said receptacle cover to enable the contents of the receptacle to be dumped into the wagon.

9. In a collecting wagon for collecting from receptacles, the combination of an arm pivotally supported on the wagon and carrying a receptacle cover, a base connected with said cover to engage the bottom of the receptacle, means including a crank and racks and pinions for raising said base to clamp the receptacle between the base and the cover, said arm operating to swing up and hold said receptacle cover and base over the wagon with the receptacle clamped therebetween in a substantially inverted position, and a movable closure in said receptacle cover to enable the contents of the receptacle to be dumped into the wagon.

10. In a collecting wagon for collecting from receptacles, the combination of an arm pivotally mounted at the side of the wagon, means for guiding said arm along the side of the wagon, a receptacle cover carried by the said arm, a base connected with said receptacle cover, means for moving said cover and said base relatively to each other to clamp the receptacle between the base and the cover, and means connected with said arm for swinging said arm up to hold the receptacle cover, base and receptacle over the wagon.

In testimony whereof we have hereunto set our hands in presence of two subscribing witnesses.

CLARENCE M. LOWES.
FRANCIS D. AMMEN.

Witnesses for Clarence M. Lowes:
JOSEPH HOFFMANN,
R. A. DOOLITTLE.

Witnesses for Francis D. Ammen:
LENA ELFMAN,
E. H. BICKERTON.